(12) United States Patent
Gould et al.

(10) Patent No.: US 11,840,191 B1
(45) Date of Patent: Dec. 12, 2023

(54) ROOF MOUNTED FRONTAL AIRBAG WITH DISPLAY SCREEN PROTECTION

(71) Applicant: ZF Passive Safety Systems US Inc., Washington, MI (US)

(72) Inventors: Douglas Gould, Lake Orion, MI (US); Uriah Horton, Shelby Township, MI (US); David Varcoe, Bruce Township, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 17/983,439

(22) Filed: Nov. 9, 2022

(51) Int. Cl.
*B60R 21/232* (2011.01)
*B60R 21/2338* (2011.01)
*B60K 35/00* (2006.01)
*B60R 21/214* (2011.01)

(52) U.S. Cl.
CPC ............ *B60R 21/232* (2013.01); *B60K 35/00* (2013.01); *B60R 21/214* (2013.01); *B60R 21/2338* (2013.01); *B60K 2370/152* (2019.05)

(58) Field of Classification Search
CPC ........ B60R 21/213; B60R 2021/23386; B60R 2021/161; B60R 2021/23308; B60R 2021/23388; B60R 21/231; B60R 21/232; B60R 21/214; B60R 21/2338
See application file for complete search history.

(56) References Cited

U.S. PATENT DOCUMENTS

| 9,180,832 | B2 * | 11/2015 | Le Norcy | ........... B60R 21/2342 |
| 11,148,631 | B2 * | 10/2021 | Jaradi | ................... B60R 21/205 |
| 11,518,319 | B2 * | 12/2022 | Daly, Jr. | ................. H04L 12/40 |
| 11,535,186 | B2 * | 12/2022 | Jaradi | ................... B60R 21/214 |
| 11,560,117 | B2 * | 1/2023 | Navarro Arranz | .... B60R 21/214 |
| 2002/0024200 | A1 * | 2/2002 | Eckert | ................... B60R 21/232 |
| | | | | 280/732 |
| 2017/0113646 | A1 * | 4/2017 | Lee | ...................... B60R 21/2338 |
| 2019/0375363 | A1 * | 12/2019 | Abe | ....................... B60R 21/233 |
| 2020/0276954 | A1 | 9/2020 | Navarro Arranz et al. | |

FOREIGN PATENT DOCUMENTS

WO WO-2021126363 A1 * 6/2021 ........... B60R 21/214

* cited by examiner

*Primary Examiner* — Paul N Dickson
*Assistant Examiner* — Tiffany L Webb
(74) *Attorney, Agent, or Firm* — TAROLLI, SUNDHEIM, COVELL & TUMMINO L.L.P.

(57) ABSTRACT

An apparatus includes an airbag configured to be mounted to a roof of a vehicle and deployable downward from the vehicle roof. The airbag has a stored condition in which the airbag is deflated and concealed behind a vehicle headliner. The airbag has an inflated and deployed condition in which a first portion is configured to extend along a portion of a windshield, a second portion is configured to extend rearward from the first portion toward an occupant, and a third portion is configured to extend downward from the second portion and to be positioned between the occupant and a display screen. A deployment tether is configured to initially delay deployment of the second portion of the airbag while the third portion deploys. The deployment tether is configured to rupture after the initial delay so the second portion can fully inflate and deploy.

21 Claims, 5 Drawing Sheets

ROOF MOUNTED FRONTAL AIRBAG WITH DISPLAY SCREEN PROTECTION

TECHNICAL FIELD

This disclosure relates to vehicle safety systems. More particularly, the disclosure relates to an apparatus for helping to protect an occupant of a vehicle upon the occurrence of an event, such as a vehicle collision. The apparatus includes a frontal airbag configured to protect front seat occupants from impacts with an instrument panel of the vehicle.

BACKGROUND

Vehicle instrumentation and control systems are central to the driving experience. This technology, which began as simple gauges and mechanical controls (e.g., buttons, knobs, switches, levers, etc.), now utilizes electronic interactive touchscreen displays that are dynamic and configurable to the user's preferences. These interactive displays can control traditional features, such as climate control, navigation, and entertainment systems, as well as some traditionally mechanical/manually controlled components, such as gear shifters, parking brake actuators, window controls, door lock controls, mirror controls, etc. Adding-in internet connectivity, these systems have evolved to a point where these interactive display screens serve a dominant role in the operation of the vehicle. As such, the display screens are becoming physically larger, greater in number, and more prominently positioned, so that all vehicle occupants can access their features.

In addition to this, the automobile industry is trending toward autonomous driving features, with purely autonomous, i.e., "driverless" vehicles on the horizon. These types of vehicles are not constrained to the passenger compartment configurations necessitated by vehicles operated by drivers. Because of this, cabin seating is highly configurable, as is the size, position, and location of the display screens.

As a result of this evolution, the interactive display screen has become a prominent feature in the vehicle, not only for the vehicle driver/operator, but also for passengers, who routinely access some of these controls. Because interactive display screens are becoming the information and control center for the vehicle, their size and position in the vehicle is becoming more prominent. In some vehicles, large screens, such as 17-inch screens, 21-inch screens, or larger (measured diagonally) are mounted centrally on the instrument panel. While these large rectangular screens typically have been positioned in the portrait orientation (i.e., long dimension vertical), some vehicles are shifting to a landscape orientation (i.e., long dimension horizontal). Along with this evolution, instrument panel-mounted large display screens on the passenger side of the vehicle are not far off.

The implementation of large, instrument panel-mounted interactive display screens presents new challenges in regard to vehicle safety systems. Because the display screens are interactive, they need to be reachable by vehicle occupants. Center-mounted screens need to be reached by both the driver and passenger, and passenger side-mounted screens need to be reached by the passengers. Additionally, because display screen controls can eliminate the need for center console controls, the center console can be eliminated, thus presenting the possibility of a front row, center seat occupant that the vehicle safety system must account for.

Furthermore, because the display screens depend on being reached via touch and on being viewed by the passengers in the cabin space, their positions in the vehicle is important. As a result, the display screens can be positioned rearward of the instrument panel, closer to the occupants, to meet reach requirements. The display screens can also be positioned so that they extend vertically above an upper surface of the instrument panel. Accordingly, the vehicle safety system must account for the presence of these structural possibilities.

SUMMARY

An apparatus for helping to protect an occupant of a seat in a vehicle including an instrument panel and a display screen on the instrument panel includes an airbag configured to be mounted to a roof of the vehicle and deployable downward from the vehicle roof. The airbag has a stored condition in which the airbag is deflated and concealed behind a vehicle headliner. The airbag has an inflated and deployed condition in which a first portion is configured to extend along a portion of the windshield, a second portion is configured to extend rearward from the first portion toward the occupant, and a third portion is configured to extend downward from the second portion and to be positioned between the occupant and the display screen. The apparatus also includes a deployment tether configured to initially delay deployment of the second portion of the airbag while the third portion deploys, the deployment tether being configured to rupture after the initial delay so the second portion can fully inflate and deploy.

According to one aspect, the airbag can have a length and first and second opposite end portions spaced along the length. The first, second, and third portions of the airbag can extend along the length of the airbag and can be delineated by bends in the airbag.

According to another aspect, the first portion can be configured to deploy in a downward and forward direction in the vehicle from the roof into the space behind the display screen. The second portion can be configured to deploy rearward above the instrument panel and display screen. The third portion can be configured to deploy downward along occupant facing surfaces of the instrument panel and display screen.

According to another aspect, the airbag can have a substantially uniform thickness along the length between the first and second end portions.

According to another aspect, the airbag can also include internal tethers that interconnect overlying panels of the airbag to control the thickness of the airbag and to define inflatable chambers within the inflatable volume.

According to another aspect, the airbag can include shaping tethers that interconnect external surfaces of the airbag to restrict movement of the of first and second portions relative to each other when the airbag deploys, which forms the bends that delineate the first, second, and third portions of the airbag.

According to another aspect, each shaping tether can have a length configured to be shorter than the distance between points on the external surface of the airbag to which it is connected.

According to another aspect, the shaping tethers can include a first shaping tether connected to the first and second portions of the airbag on a front panel of the airbag. The first shaping tether can have a length that is shorter than the distance between the points on the front panel to which it is connected. The shaping tethers can also include a second shaping tether connected to the second and third portions of the airbag on a rear panel of the airbag. The second shaping tether can have a length that is shorter than the distance between the points on the front panel to which it is connected.

According to another aspect, the airbag can be configured to assume a generally rectangular, uniform thickness shape when inflated without being restricted by the shaping tethers. The shaping tethers can be configured to form the bends that shape the first, second, and third portions of the airbag.

According to another aspect, the airbag can include at least one shaping tether having opposite ends connected to an external surface of the airbag at spaced locations on the external surface. The length of the tether can be shorter than the distance between the spaced locations as measured along the external surface. The tether can be configured to limit movement of the spaced locations when the airbag deploys so that a bend is formed in the airbag.

According to another aspect, the deployment tether can be connected to a front surface of the airbag.

According to another aspect, the deployment tether can have a first end connected to the front surface of the airbag at or near an upper end portion of the airbag, and an opposite second end connected to the front surface of the airbag at a location at or near a bend between the second and third portions of the airbag.

According to another aspect, the deployment tether can be a releasable connection for releasing the second portion after the delay. The releasable connection can be a tear seam, tear stitching, or an actuatable release mechanism.

According to another aspect, the display screen can have an upper portion that extends vertically above the upper surface of the instrument panel. The delay can be configured to permit the third portion to clear the upper portion of the display screen.

According to another aspect, the display screen can be positioned rearward of an occupant facing surface of the instrument panel.

According to another aspect, the third portion can be configured to extend below a lower extend of the display screen and to cover the occupant facing surface of the instrument panel.

According to another aspect, an airbag module can include the apparatus including the airbag and the deployment tether, an inflator for inflating the airbag, and a housing for storing the airbag in the stored condition.

According to another aspect, the housing can be configured to be mounted to the vehicle roof along a front edge of the roof.

According to another aspect, the airbag can be configured to deploy through an opening defined at least partially by the roof and the headliner in a direction that is generally downward and forward into the space above the instrument panel.

According to another aspect, the airbag can be configured to cover the instrument panel in front of at least one of a driver side seating position, a passenger side seating position, and a center seating position in the vehicle.

According to another aspect, a vehicle safety system can include the airbag module and a controller for actuating the inflator in response to detecting the occurrence of an event for which occupant protection is desired.

BRIEF DESCRIPTION OF THE DRAWINGS

The foregoing and other features will become apparent to one skilled in the art to which this disclosure relates upon consideration of the following description with reference to the accompanying drawings, in which.

DETAILED DESCRIPTION

Figure 1:
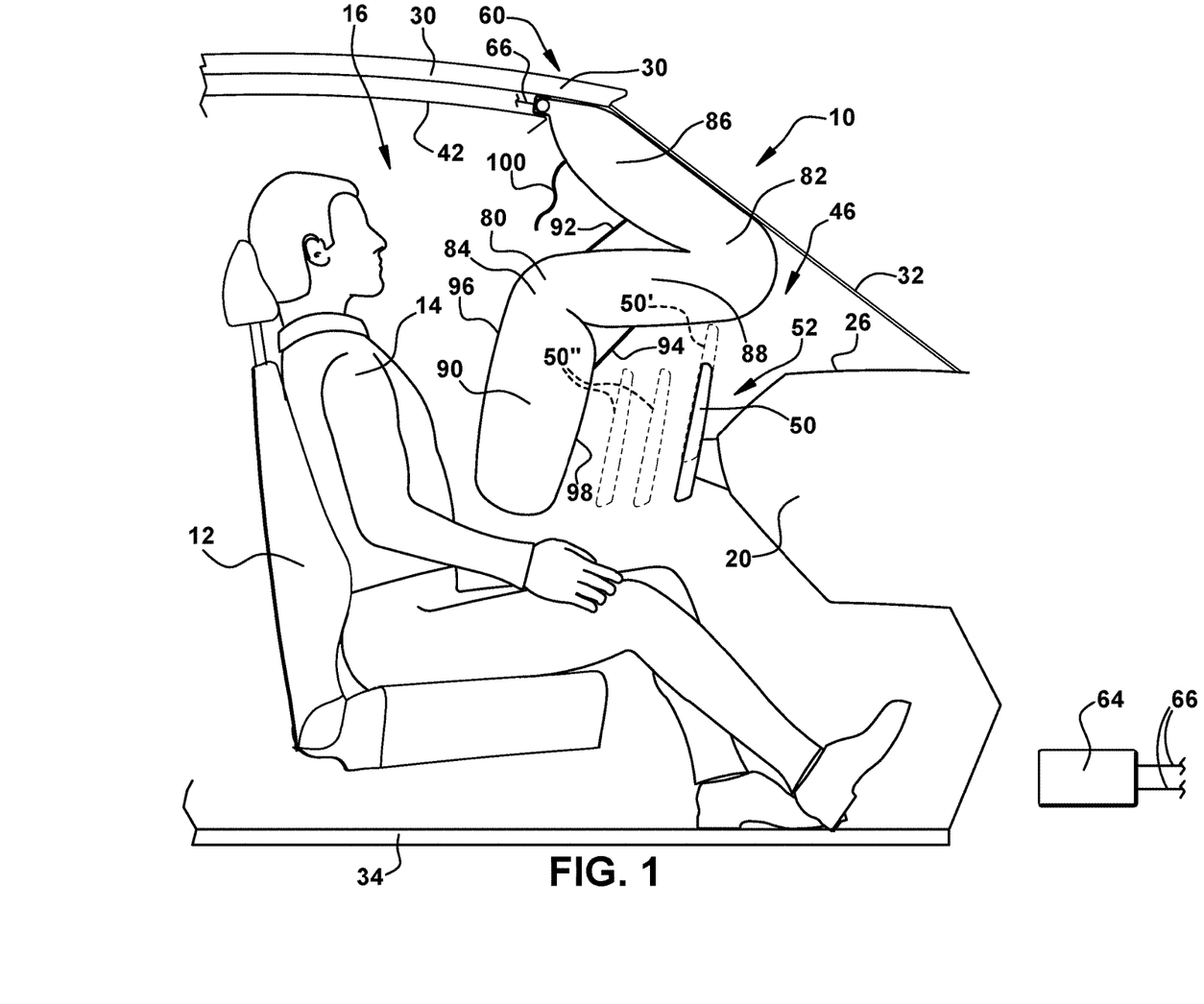
FIG. 1 is a schematic side view depicting a vehicle including a vehicle safety system configured to account for an instrument panel mounted display screen, according to an example configuration.

FIG. 1 illustrates a vehicle 10 that includes that includes a vehicle safety system 60 configured to help protect an occupant 14 of a vehicle seat 12 in a passenger cabin 16 of the vehicle. In FIG. 1, the occupant 14 is a forward-facing, front row occupant seated facing an instrument panel 20 upon which a display screen 50 is mounted. While the configuration of the safety system 60 illustrated herein is discussed in reference to being implemented to help protect an occupant of a center or passenger side first row vehicle seat, the system can be associated with any seating position in the vehicle 10. The safety system 60 can therefore be configured to help protect an occupant of a driver side seat, passenger side seat, or center seat, and can be configured to help protect an occupant of any row, i.e., first, second, third, etc. With this in mind, the vehicle 10 could be configured so that each row of seats 12 accommodates any number of occupants, i.e., one or more, and that the safety system 60 can be configured to help occupants at any of these seating locations, as long as that seating location presents vehicle structure and/or architecture that facilitates its operation as described herein.

Figure 2:
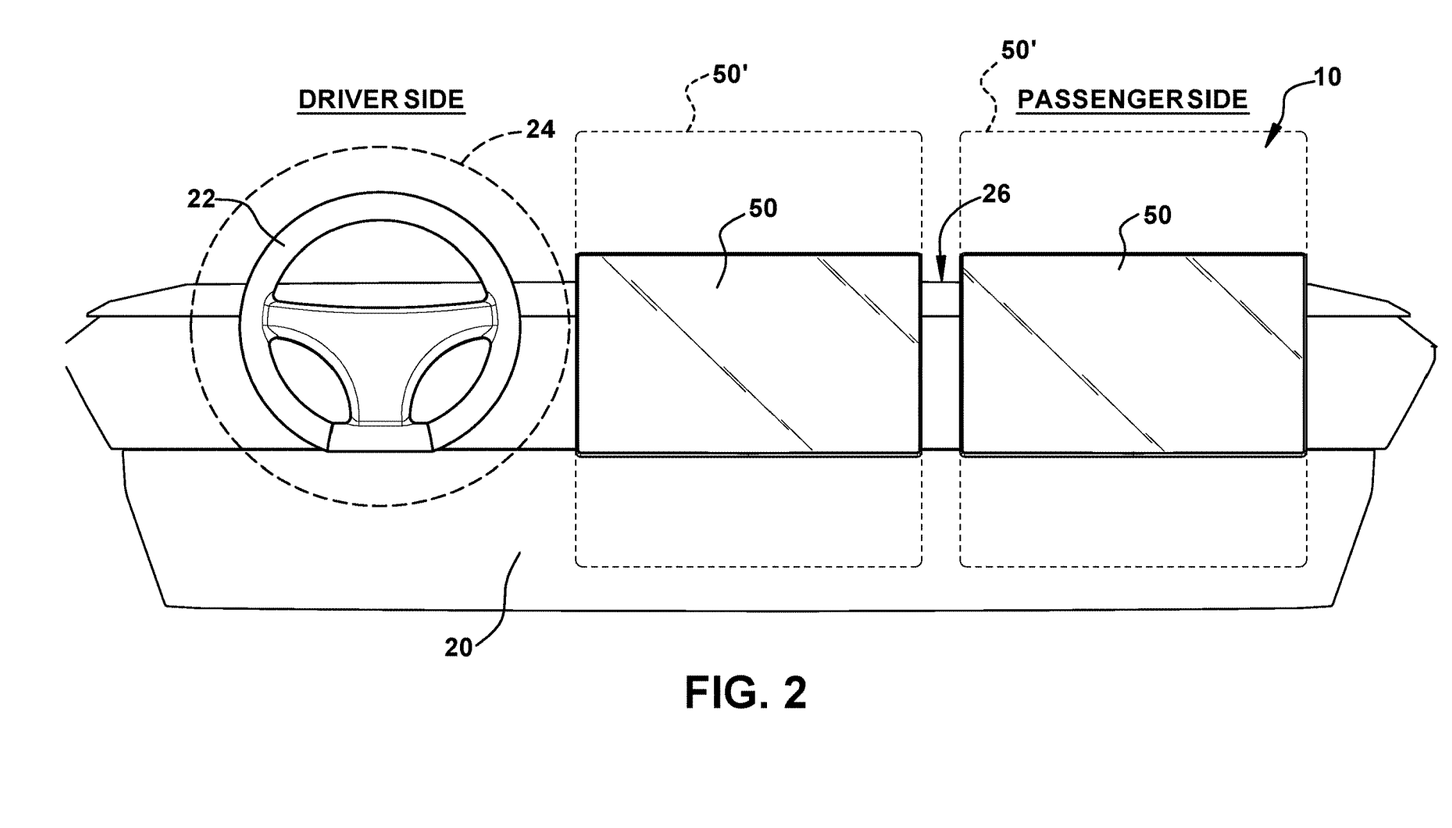
FIG. 2 is a plan view illustrating an example configuration of an instrument panel of the vehicle, including a steering wheel and display screens for which the vehicle safety system according to the example configuration of FIG. 1 can be implemented.

Referring to FIGS. 1 and 2, the vehicle 10 includes an instrument panel 20 that extends the width of the vehicle in front of the first row seats 12 and any occupants 14 of those seats. A steering wheel 22 is positioned on the driver side of the vehicle 10 and is presented toward the occupant 14 of the driver side seat 12. The steering wheel 22 can house a traditional steering wheel mounted driver airbag, which is shown generally in dashed lines at 24. The instrument panel 20 traditionally has held instrumentation, such as gauge clusters, and controls, such as knobs, switches, etc., that allow the driver and/or passenger to control the vehicle 10 and its auxiliary features. For the vehicle of FIGS. 1 and 2, however, the instrument panel 20 includes interactive display screens 50, referred to herein alternatively as "display screens," "displays," or "screens," that can take the place of many or all of the traditional instrument panel mounted operator controls. This does not mean that the display screens 50 replace all instrumentation and controls. The display screens 50 can be used in addition to traditional instrumentation and controls in any combination.

The display screens 50 can be used to access and control vehicle systems such as those listed below. This list is by way of example and is not meant to be exhaustive:
Vehicle Entertainment Systems:
Broadcast Radio Satellite Radio
Internet Radio
Streaming Services, such as Apple Music®, Android Auto, Spotify®, Amazon Music®, podcasts, etc.
Streaming Video
Internet Access
Climate Controls:
   Cabin Heat & Air Conditioning
   Heated/Cooled Seats
   Heated Steering Wheel
Vehicle Navigation System
Driving Modes:
   Economy, Sport, Off-Road, Snow, Rain, etc.
   Tow/Haul Mode
   Cruise Control
   Adaptive Cruise
   Autonomous Mode
Communication Systems:
   Telephone
   Emergency Roadside Assistance
Auxiliary Controls:
   Windows/Sunroof/Moonroof
   Exterior Lighting
   Interior Lighting
   Wiper Controls/Settings
   Seat Position and Memory
   Door Locks/Auto-lock Settings As shown in FIGS. 1 and 2, there are two display screens 50: one that is center mounted on the instrument panel 20, and one mounted on the right or passenger side of the instrument panel. The center mounted display screen 50 can be configured to be reached by the occupant 14 of any seating position in the front row, i.e., the driver side seat, the passenger side seat, or the center seat. The passenger side mounted display screen 50 can be configured to be accessed by an occupant of the center seat or the passenger seat. The passenger side display screen 50 can be optional, i.e., the vehicle 10 might include only a center display screen 50. Because the display screens 50 can take over, to a large extent, the operator control interface functions of conventional instrument panel located controls, the screens can be very large, i.e., up to 21-inches diagonal or more.

FIG. 1 shows a side view of the vehicle 10 in which the occupant 14 is seated, as viewed from the passenger side of the vehicle. The side view of FIG. 1 can therefore be that of a passenger side seated occupant 14 or a center seated occupant. As shown in FIG. 1, the display screen 50 is positioned away from the instrument panel 20, extending rearward toward the occupant 14 and upward above an upper surface 26 of the instrument panel. Alternative positions for the display screen 50 are also shown in dashed lines—one in which the screen extends higher in the vehicle (reference number 50') and one in which the screen is positioned closer to the occupant (reference number 50").

Within the confines of the vehicle cabin 16, the configurations of the instrument panel 20 and display screen 50, in combination with the position of the seat 12 and the size of the occupant 14, help define the space or area within which vehicle safety system components, such as airbags can be deployed. Because the display screens 50 are so large and prominently positioned in the cabin 16, addressing vehicle safety needs to take these factors into consideration. Accordingly, the vehicle safety system 60 includes an airbag module 62 that is mounted at a front edge portion 40 of the vehicle roof 30 adjacent the windshield 32, which positions the airbag module above the instrument panel 20 and the display screen(s) 50 and is configured to account for their presence.

Figure 3:
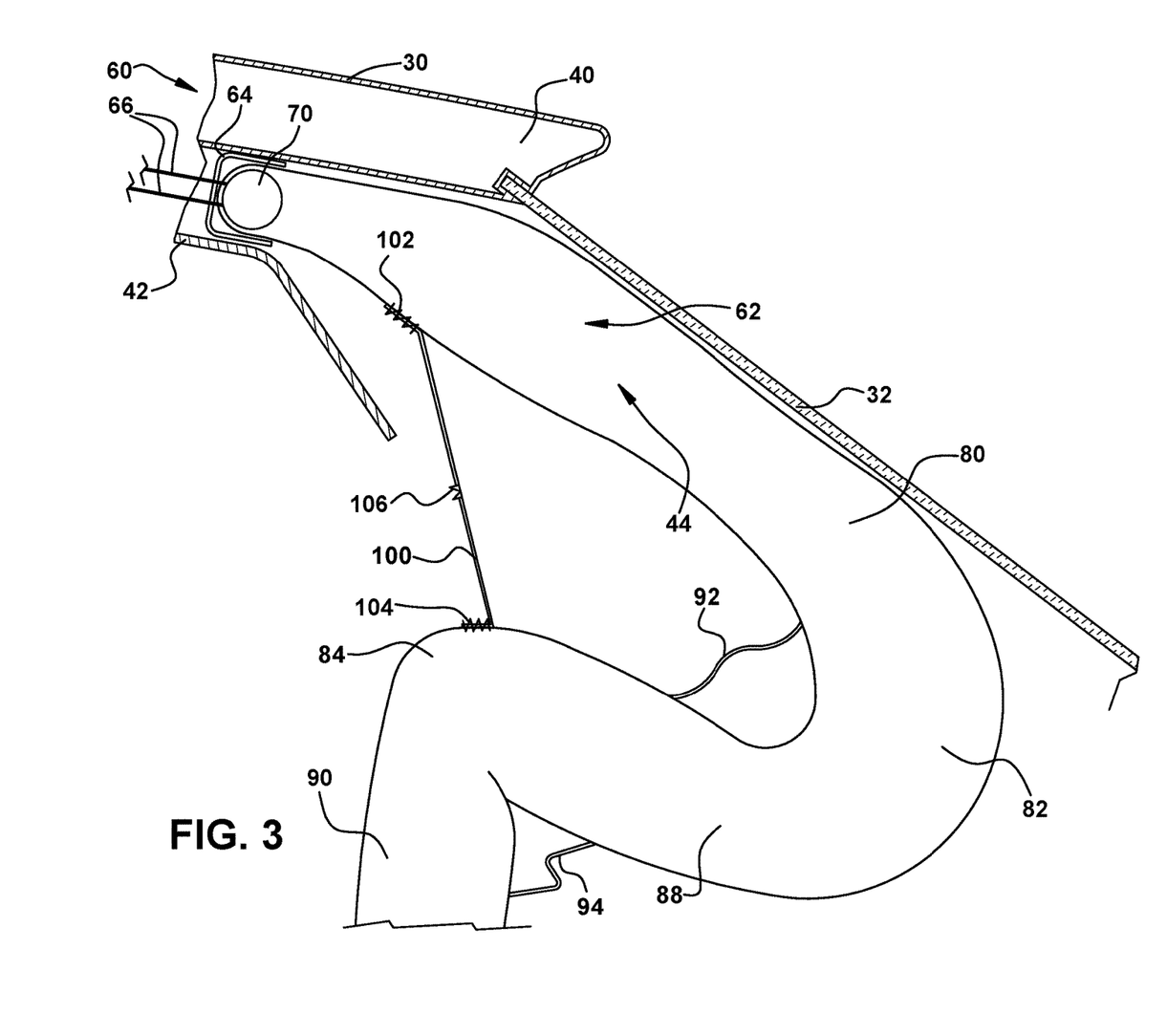
FIG. 3 is a side section view illustrating an airbag module that forms a portion of the safety system of FIG. 1, according to an example configuration.

The airbag module is illustrated in greater detail in FIG. 3. Referring to FIGS. 1 and 3, the airbag module 62 includes a housing 64 which supports an inflator 70 and a frontal airbag 80, which is shown in an inflated and deployed condition. The safety system 60 also includes a controller 64 (FIG. 1), such as an airbag controller, that is configured to actuate the inflator 70 via wiring 66 to inflate and deploy the airbag 80 in response to sensing the occurrence of an event, such as a vehicle crash, for which occupant protection is desired.

As shown, the airbag 80 can be a shaped cushion airbag in which a cushion 78 has a uniform shape, such as a rectangular, mattress-like shape, which is shaped by tethers that interconnect certain portions and restrict their movement relative to each other. Referring to FIG. 1, the airbag 80 can comprise a generally rectangular cushion 78 with a substantially uniform thickness along its length. The rectangular airbag cushion 78 can have first and second bends 82, 84 that define inflatable cushion portions 86, 88, 90 that define the overall shape of the airbag 80. The bends 82, 84 are formed as a result of first and second shaping tethers 92, 94. The first shaping tether 92 connects the first and second cushion portions 86, 88. The second shaping tether 94 connects the second and third cushion portions 88, 90.

The airbag 80 has a first or front panel 96 presented facing the occupant 14 and a second or rear panel 98 that faces away from the occupant, toward the instrument panel 20. The first shaping tether 92 is connected to the front panel 96 and has a length that is shorter than the distance between the points on the front panel to which it is connected. The second shaping tether 94 is connected to the rear panel 98 and has a length that is shorter than the distance between the points on the rear panel to which it is connected. The airbag 80 is folded in the stored condition to account for the length differentials between the tethers 90, 92 and their connections to the cushion 78. When the airbag 80 is inflated and begins to unfold, its tendency to assume the rectangular, uniform thickness shape of the cushion 78 is restricted by the shaping tethers 92, 94, and the bends 82, 84 are formed. From this, it can be appreciated that a simple airbag design utilizing a rectangular inflatable cushion, can be shaped to follow a desired shape and position.

The presence of the display screen 50 presents a challenge in providing frontal occupant protection via the airbag 80. Typically, passenger frontal airbags are stored in an upper portion of the instrument panel 20 and deploy from an upper portion of the instrument panel, at or near the upper surface 26. Because, however, the display screen 50 extends above the upper surface 26 and rearward toward the occupant 14, deploying an airbag from the traditional location in the upper portion of the instrument panel 20 becomes problematic. This is because the deploying airbag can engage the display screen 50, which can cause problems, such as damage to the airbag and/or launching the display screen in the vehicle cabin 16, creating the potential for striking the occupant 14. This possibility can be exacerbated in configurations where the display screen 50 is positioned higher above the instrument panel 20 (e.g., screen 50') or closer to the occupant 14 (e.g., screen 50").

Advantageously, the vehicle safety system 60 is configured to avoid these issues. To do so, the airbag module 62 is mounted along the front edge portion 40 of the roof 30. As shown in FIG. 3, the airbag module 62 is concealed behind a headliner 42 of the roof 30 and includes a housing 64 that houses the inflator 70 and the airbag 80. The configuration illustrated in FIG. 3 is by way of example only. It will be appreciated that the configuration of the airbag module 62, particularly the housing 64, can depend on the configuration of the particular vehicle 10 in which it is installed. Suffice to say, in any configuration, the airbag module 62 can be configured so that the airbag 80 deploys through an opening 44 between the roof 30 and the headliner 42 into the passenger cabin 16, toward the space 46 defined by the upper surface 26 of the instrument panel 20 and the windshield 32 and rearward between the seated occupant 14 and the instrument panel/display screen.

The manner in which the airbag module 62 and the surrounding vehicle structure, i.e., the headliner 42, trim pieces (not shown), etc., are configured to permit airbag deployment is not important, as long as the airbag 80 is permitted to inflate and deploy in the manner described herein. For example, the headliner 42 could be configured to rupture, e.g., along a pre-defined tear seam, to permit airbag deployment. As another example, the headliner 42 can be configured to release from a structure, such as a trim piece, to create an opening along a front edge of the headliner through which the airbag 80 can deploy. This can, for example, be the manner in which the opening 44 shown in FIG. 3 is created.

The airbag 80 is configured, when inflated and deployed, to be positioned between the occupant 14 and the instrument panel 20 so as to cushion and absorb occupant impacts. This configuration takes into account not only the instrument panel 20, but also any other structure, including the display screen 50, that is mounted on or otherwise included with the instrument panel. As shown in FIG. 1, in the inflated and deployed condition, the airbag 80 is configured to be spaced from and follow the general contour of the instrument panel 20 while avoiding the display screen 50. The inflated and deployed airbag 80 extends rearward in the vehicle 10 beyond the instrument panel 20 toward the occupant 14 and downward into the space between the occupant and the instrument panel/display screen 50.

In the example configuration illustrated in FIG. 1, the first portion 86 of the airbag 80 can extend along and be positioned against the windshield 32, which supports the airbag during occupant impacts with the airbag. The windshield 32 forms a reaction surface against which the airbag 80 is supported, which allows the airbag to absorb impact forces exerted by the occupant and cushion the impacting occupant by providing a "ride-down" effect.

The first bend 82 causes the second portion 88 to extend away from the windshield 32 above the instrument panel 20 and the display screen 50. The second bend 84 causes the third portion 90 to extend downward toward the floor 34 and base of the seat 12 in front of the occupant 14. The bend angles enforced by the first and second shaping tethers 92, 94 create a shape of the airbag 50 that complies with the space dictated by the vehicle architecture while, at the same time, positions the airbag for receiving the occupant 14.

The configuration of the airbag 80 illustrated in FIG. 1 is but one example configuration that can achieve these purposes. It will be appreciated that the configuration of the airbag 80 could differ, even significantly, without effecting the novel and advantageous features of the safety system 60 described herein. For example, the configuration of the airbag 80 could change according to variations in the vehicle architecture, such as the shape of the instrument panel or the position/extent of the display screen 50.

The airbag 80 can be constructed in a variety of manners. For example, the airbag 80 can be constructed of a fabric material, such as a woven nylon or polyester fabric. According to one example construction, the airbag 80 can include multiple airbag panels that are cut or otherwise formed in predetermined shapes and then interconnected by known methods, such by stitching or ultrasonic welding. Alternatively, the airbag 80 or a portion thereof can be woven in what is referred to as a one-piece woven (OPW) construction. An OPW airbag construction involves weaving multiple airbag panels simultaneously with portions of the panels being interwoven to form seams. An OPW airbag can therefore be constructed of a single piece of woven material that defines the inflatable volume of the airbag.

For the generally rectangular configuration of the airbag 80 illustrated in the figures, the airbag can be constructed of separate rectangular panels connected about their peripheries or in an OPW construction where the panels are woven simultaneously. In either construction, the airbag 80 can include internal connections, such as tethers, that connect the panels and form inflatable chambers, such as longitudinally extending, parallel chambers. The shaping tethers 92, 94 can be attached to the airbag externally, after the cushion is formed.

Regardless of the construction, the airbag 80 can be coated with a gas impermeable material, such as urethane, or laminated with a gas impermeable film. The airbag 80 thus can have a substantially gas-tight construction. Those skilled in the art will appreciate that alternative materials, such as polyester yarn, and alternatives coatings, such as silicone, can also be used to construct the airbag 80.

In the inflated and deployed condition of the airbag 80, the rear panel 98 follows the contour of the windshield 32 to the first bend 82. At the first bend 82, the rear panel 98 then extends above and along an upper surface 26 of the instrument panel 20, over and beyond the display screen 50 to the second bend 84. At the second bend 84, the rear panel 98 follows and is spaced from a front surface 28 of the instrument panel 20 down to just above the seat 12, in the area of the occupant's lap. This positions the second and third portions 90, 92 of the airbag 50 between the occupant 14 and the instrument panel 20 and display screen 50.

During inflation, the airbag 80 deploys from the roof 30 into the space 46 above the instrument panel 20 and adjacent the windshield 32. The airbag 80 is stored in the front edge 40 of the roof 30 and deploys from that location into the space 46 above the instrument panel 20. Because of this, during the initial stages of deployment, there are forward and downward components to the direction in which the airbag inflates and deploys. Normally, in the absence of a display screen 50, or in vehicle configurations where the display screen is contained and embedded within the instrument panel 20, the airbag 80 can continue to inflate and deploy rearward from the space 46, and along the contour of the instrument panel to the fully inflated and deployed position, without obstruction. The presence of the display screen 50, however, complicates things as it can extend above the instrument panel (as shown in FIG. 1) and presents an obstacle that can obstruct the airbag 80 as it deploys in the traditional manner. The airbag 80 can enter the space 52 formed behind the display screen 50, between the screen and the instrument panel 20 and get caught or otherwise impeded. As a result, airbag deployment can be inhibited and/or the display screen 50 can break. This circumstance can be exacerbated where the display screen is especially large (see FIG. 2) and/or positioned differently (see FIG. 1 at display screens 50' and 50").

Figure 4A:
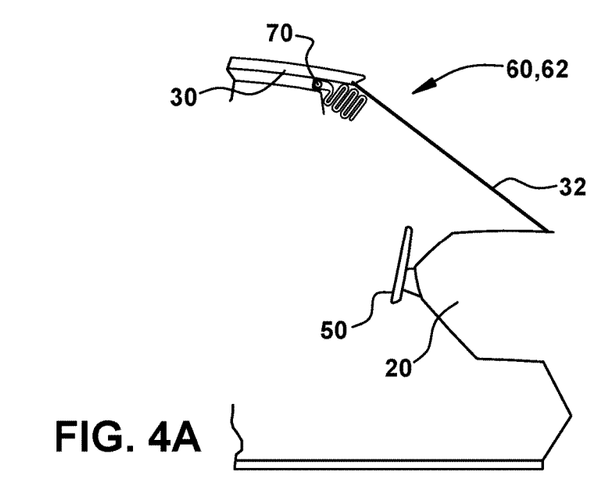
FIGS. 4A-4D are schematic side views illustrating the operation of the vehicle safety system of FIG. 1, according to an example configuration.
Figure 4B:
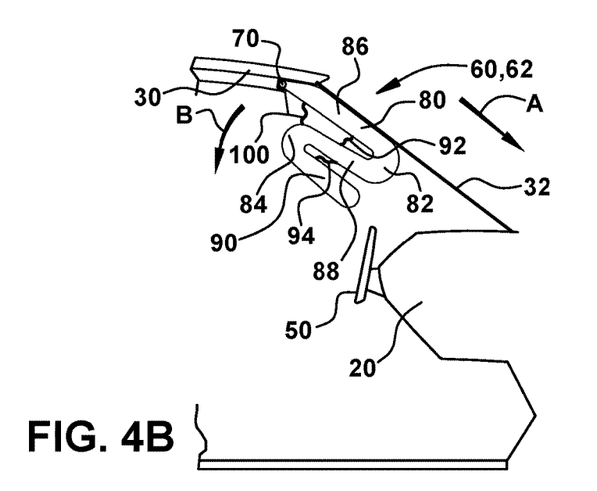
Figure 4C:
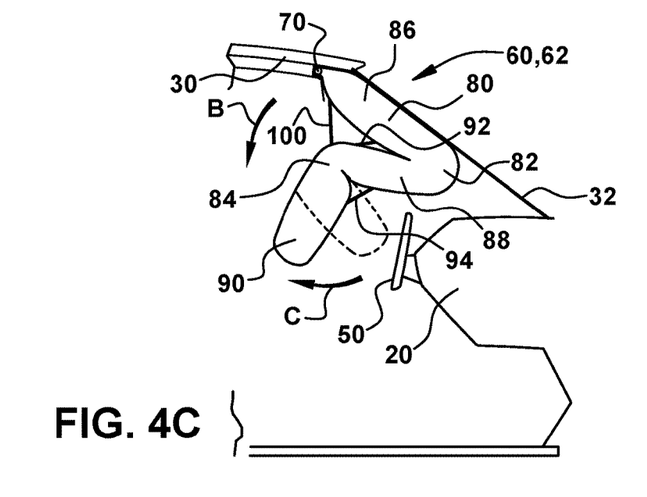

To account for the presence of the display screen 50 and to promote rapid and unobstructed inflation and deployment of the airbag 80, free from interference from the display screen 50, the airbag module includes a deployment tether 100 that helps to control the manner in which the airbag 80 inflates and deploys. This is shown in FIGS. 4A-4D. Referring to FIG. 4A, the airbag 80 is stored behind the headliner 42 in a zigzag fold so that the initial deployment direction of the airbag is axial along the windshield 32, as indicated generally by arrow A in FIG. 4A.

Because inflation fluid is directed from the inflator 70 into the first portion 86, it inflates and deploys to a position adjacent the windshield 32, taking the second and third portions 88, 90 with it. The second portion 88 pivots downward from the first bend 82, as indicated by arrow B in FIG. 4B. The third portion 90 pivots downward from the second bend 84, as indicated by arrow C in FIG. 4C. When the airbag 80 reaches the condition shown in FIG. 4C, the deployment tether 100 is tensioned, which creates a delay in the movement of the second portion 88 in the direction of arrow B. This delay allows the third portion 90 to move/pivot in the direction of arrow C, which helps ensure that the third portion clears the display screen 50.

Figure 4D:
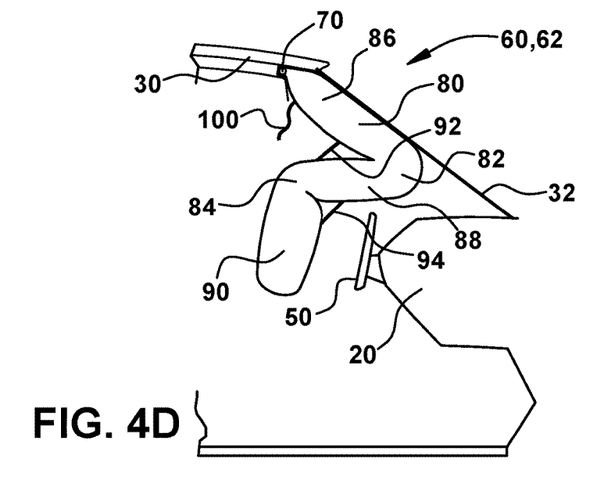

The deployment tether 100 is configured to rupture at a point during deployment where the delay in movement is sufficient to ensure that the airbag 80 will clear the display screen 50. After the delay, the deployment tether 100 ruptures, which allows the second and third portions 88, 90 to move into their respective deployed conditions. This is shown in FIG. 4D. In this condition, the shaping tethers 92, 94 are tensioned and control the bends 82, 84 and the shape/position of the second and third portions 88, 90 of the airbag 80.

A release element is responsible for controlling the restriction/inhibition of airbag deployment by determining when to release the tether 100. The release element can be implemented in different manners. For example, the release element can be tear stitching that connects the deployment tether 100 to the airbag 80. The tear stitching can be the stitching 102 and/or 104 (see, FIG. 3) that connects the opposite ends of the tether 100 to the airbag 80. The tear stitching can be configured to rupture and release the tether 100 and, thus, the airbag 80, at a predetermined stage of deployment. As another example, the release element can be a tear seam 106 along which the tether 100 itself ruptures. As a further example, the release element can be an actuatable device, such as an actuatable fastener that is operatively connected to a controller, such as an airbag controller, configured to release the tether at a predetermined point, such as after a time delay after actuating the inflator 70. In this example, the actuatable device 106 could, for instance, be fixed to the airbag module 62, e.g., the housing 64.

The point at which the deployment tether 100 to release the second portion 92 is configured to occur at a stage of airbag inflation sufficient to ensure that the second and third portions 92, 94 sufficiently clear the display screen 50 and the space 52 behind the display screen. Clearing this structure/space helps ensure that the second and third portions 92, 94 can deploy rearward in the vehicle, i.e., toward the occupant 14 efficiently, without being inhibited, at least significantly, due to engaging the display screen or deploying into the space behind the display screen. This allows the airbag 80 to reach the fully inflated and deployed condition of FIG. 4D (see also FIG. 1) efficiently in a repeatable and reliable manner.

The delay implemented by the tether 100 allows the third portion 90 to begin to develop, i.e., inflate and deploy, prior to the second portion 88. Even if only momentarily, the early development of the third portion 90 allows it to avoid interactions with the display screen 50, and the space 52 behind the display screen, that could inhibit its deployment and/or cause the screen to detach or fragment.

Figure 5A:
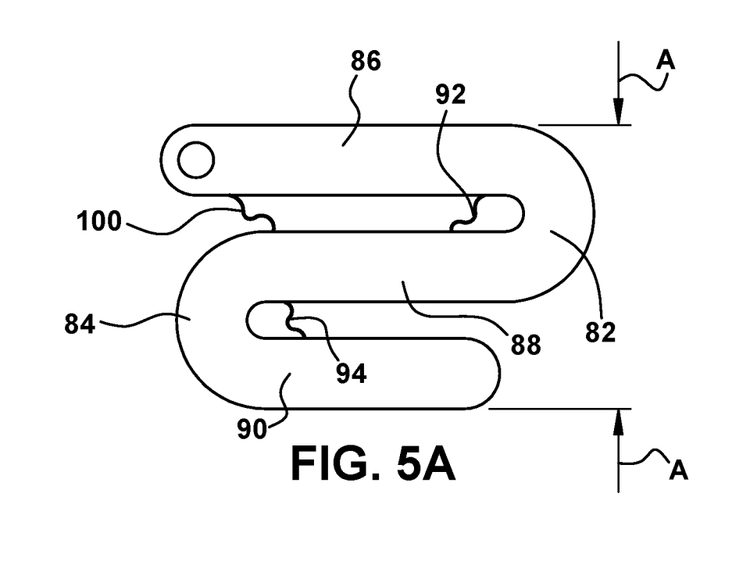
FIGS. 5A-5C are schematic side views illustrating an example manner in which an airbag of the vehicle safety system can be placed in a deflated and stored condition.
Figure 5B:
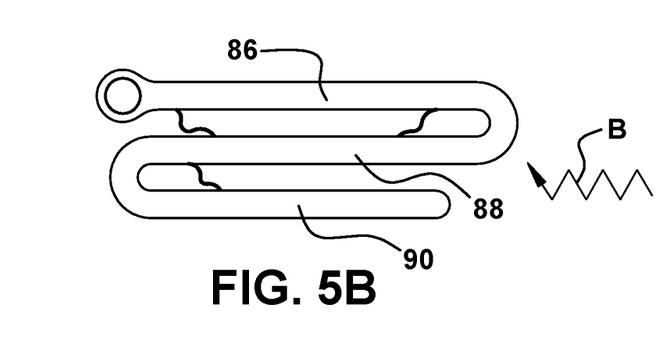
Figure 5C:
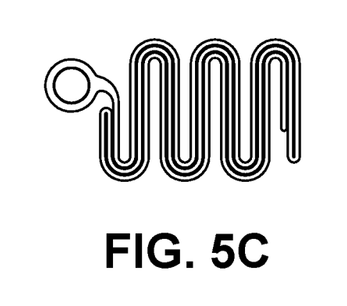

The airbag 80 can be placed in the deflated and stored condition in a variety of manners, one of which is illustrated in FIGS. 5A-5C. FIG. 5A shows the airbag 80 prior to being placed in the deflated and stored condition, with the tethers 92, 94, and 100 in place. As shown in FIG. 5B, the first portion 86, second portion 88, and third portion 90 are flattened against each other (see Arrows A in FIG. 5A) so that the airbag 80 can be rolled/folded and packaged for installation. As indicated generally by arrow B in FIG. 5B, the airbag 80 can be folded up in a back and forth manner referred to herein as a zigzag fold. The zigzag folded airbag 80 shown in FIG. 5C is ready to be installed in the vehicle.

The configuration of the airbag 80 illustrated in the figures is one example implementation in which the tether 100 is used to inhibit initial deployment of a roof-mounted front airbag in order to ensure that the airbag clears display panels and any other structure that may project from an instrument panel or other structure positioned in front of a seated occupant. It will be appreciated that the functionality produced by the tether can be achieved with airbag and/or tether configurations that differ from those disclosed herein without departing from the spirit and scope of this disclosure.

For example, the length of the tether 100 can be increased or decreased in order to increase or decrease, respectively, the degree to which the second portion 88 is permitted to deploy/move prior to the tether becoming tensioned. As another example, the strength of the release element can be increased or decreased in order to increase or decrease, respectively, the duration of deployment inhibition exerted on the second portion 88 by the tether 100. As a further example, different roll/folding methods can be used to help control deployment timing as, for example, a zigzag fold can be made to deploy more rapidly than a roll.

Additionally, the configuration of the airbag 80 itself—the shape of the cushion, thickness, contour, etc. can be adjusted to account for variations in vehicle configurations and differing vehicle architectures. The airbag 80 can include tether structures for controlling the shape of the airbag, for defining inflatable chambers of the airbag, and for controlling the inflation characteristics of the airbag. The tethers 92, 94 can be adjusted in length and or position to further control the inflated configuration of the airbag 80. Tethers can be added or removed.

From the above description of the invention, those skilled in the art will perceive improvements, changes and modifications in the invention. Such improvements, changes and modifications within the skill of the art are intended to be covered by the appended claims.

Having described the invention, we claim:

1. An apparatus for helping to protect an occupant of a seat in a vehicle including an instrument panel and a display screen on the instrument panel, the apparatus comprising:
   an airbag configured to be mounted to a roof of the vehicle and deployable downward from the vehicle roof, the airbag having a stored condition in which the airbag is deflated and concealed behind a vehicle headliner, and an inflated and deployed condition in which a first portion is configured to extend along a portion of the windshield, a second portion is configured to extend rearward from the first portion toward the occupant, and a third portion is configured to extend downward from the second portion and to be positioned between the occupant and the display screen; and a deployment tether configured to initially delay deployment of the second portion of the airbag while the third portion deploys, the deployment tether comprising a releasable connection comprising one of a tear seam, tear stitching, and a release mechanism, the deployment tether being configured to rupture after the initial delay so the second portion can fully inflate and deploy.

2. The apparatus recited in claim 1, wherein the airbag has a length and first and second opposite end portions spaced along the length, wherein the first, second, and third portions of the airbag extend along the length of the airbag and are delineated by bends in the airbag.

3. The apparatus recited in claim 2, wherein the airbag has a substantially uniform thickness along the length between the first and second end portions.

4. The apparatus recited in claim 3, wherein the airbag further comprises internal tethers that interconnect overlying panels of the airbag to control the thickness of the airbag and to define inflatable chambers within the inflatable volume.

5. The apparatus recited in claim 1, wherein the first portion is configured to deploy in a downward and forward direction in the vehicle from the roof into the space behind the display screen, wherein the second portion is configured to deploy rearward above the instrument panel and display screen, and the third portion is configured to deploy downward along occupant facing surfaces of the instrument panel and display screen.

6. The apparatus recited in claim 1, wherein the airbag comprises at least one shaping tether having opposite ends connected to an external surface of the airbag at spaced locations on the external surface, wherein the length of the tether is shorter than the distance between the spaced locations as measured along the external surface, the tether being configured to limit movement of the spaced locations when the airbag deploys so that a bend is formed in the airbag.

7. An airbag module comprising the apparatus recited in claim 1, an inflator for inflating the airbag, and a housing for storing the airbag in the stored condition.

8. The airbag module recited in claim 7, wherein the housing is configured to be mounted to the vehicle roof along a front edge of the roof.

9. The airbag module recited in claim 7, wherein the airbag is configured to deploy through an opening defined at least partially by the roof and the headliner in a direction that is generally downward and forward into the space above the instrument panel.

10. The airbag module recited in claim 7, wherein the airbag is configured to cover the instrument panel in front of at least one of a driver side seating position, a passenger side seating position, and a center seating position in the vehicle.

11. A vehicle safety system comprising the airbag module recited in claim 7 and a controller for actuating the inflator in response to detecting the occurrence of an event for which occupant protection is desired.

12. An apparatus for helping to protect an occupant of a seat in a vehicle including an instrument panel and a display screen on the instrument panel, the apparatus comprising:
an airbag configured to be mounted to a roof of the vehicle and deployable downward from the vehicle roof, the airbag having a stored condition in which the airbag is deflated and concealed behind a vehicle headliner, and an inflated and deployed condition in which a first portion is configured to extend along a portion of the windshield, a second portion is configured to extend rearward from the first portion toward the occupant, and a third portion is configured to extend downward from the second portion and to be positioned between the occupant and the display screen; and
a deployment tether configured to initially delay deployment of the second portion of the airbag while the third portion deploys, the deployment tether being configured to rupture after the initial delay so the second portion can fully inflate and deploy, wherein the airbag has a length and first and second opposite end portions spaced along the length, wherein the first, second, and third portions of the airbag extend along the length of the airbag and are delineated by bends in the airbag, and wherein the airbag comprises shaping tethers that interconnect external surfaces of the airbag to restrict movement of the of first and second portions relative to each other when the airbag deploys, which forms the bends that delineate the first, second, and third portions of the airbag.

13. The apparatus recited in claim 12, wherein each shaping tether has a length configured to be shorter than the distance between points on the external surface of the airbag to which it is connected.

14. The apparatus recited in claim 12, wherein the shaping tethers comprise:
a first shaping tether connected to the first and second portions of the airbag on a front panel of the airbag, the first shaping tether having a length that is shorter than the distance between the points on the front panel to which it is connected; and
a second shaping tether connected to the second and third portions of the airbag on a rear panel of the airbag, the second shaping tether having a length that is shorter than the distance between the points on the front panel to which it is connected.

15. The apparatus recited in claim 12, wherein the airbag is configured to assume a generally rectangular, uniform thickness shape when inflated without being restricted by the shaping tethers, and wherein the shaping tethers are configured to form the bends that shape the first, second, and third portions of the airbag.

16. An apparatus for helping to protect an occupant of a seat in a vehicle including an instrument panel and a display screen on the instrument panel, the apparatus comprising:
an airbag configured to be mounted to a roof of the vehicle and deployable downward from the vehicle roof, the airbag having a stored condition in which the airbag is deflated and concealed behind a vehicle headliner, and an inflated and deployed condition in which a first portion is configured to extend along a portion of the windshield, a second portion is configured to extend rearward from the first portion toward the occupant, and a third portion is configured to extend downward from the second portion and to be positioned between the occupant and the display screen; and
a deployment tether configured to initially delay deployment of the second portion of the airbag while the third portion deploys, the deployment tether being configured to rupture after the initial delay so the second portion can fully inflate and deploy,
wherein the airbag comprises at least one shaping tether having opposite ends connected to an external surface of the airbag at spaced locations on the external surface, wherein the length of the tether is shorter than the distance between the spaced locations as measured along the external surface, the tether being configured to limit movement of the spaced locations when the airbag deploys so that a bend is formed in the airbag, and wherein the deployment tether is connected to a front surface of the airbag.

17. The apparatus recited in claim 16, wherein the deployment tether has a first end connected to the front surface of the airbag at or near an upper end portion of the airbag, and an opposite second end connected to the front surface of the airbag at a location at or near a bend between the second and third portions of the airbag.

18. An apparatus for helping to protect an occupant of a seat in a vehicle including an instrument panel and a display screen on the instrument panel, the apparatus comprising:

an airbag configured to be mounted to a roof of the vehicle and deployable downward from the vehicle roof, the airbag having a stored condition in which the airbag is deflated and concealed behind a vehicle headliner, and an inflated and deployed condition in which a first portion is configured to extend along a portion of the windshield, a second portion is configured to extend rearward from the first portion toward the occupant, and a third portion is configured to extend downward from the second portion and to be positioned between the occupant and the display screen; and a deployment tether configured to initially delay deployment of the second portion of the airbag while the third portion deploys, the deployment tether being configured to rupture after the initial delay so the second portion can fully inflate and deploy, wherein the display screen has an upper portion that extends vertically above the upper surface of the instrument panel, and wherein the delay is configured to permit the third portion to clear the upper portion of the display screen.

19. The apparatus recited in claim 18, wherein the deployment tether comprises a releasable connection for releasing the second portion after the delay, the releasable connection comprising one of a tear seam, tear stitching, and an actuatable release mechanism.

20. The apparatus recited in claim 18, wherein the display screen is positioned rearward of an occupant facing surface of the instrument panel.

21. The apparatus recited in claim 20, wherein the third portion is configured to extend below a lower extend of the display screen and to cover the occupant facing surface of the instrument panel.

* * * * *